DATA STORAGE TIMING SYSTEM
Filed Aug. 14, 1967 8 Sheets-Sheet 1
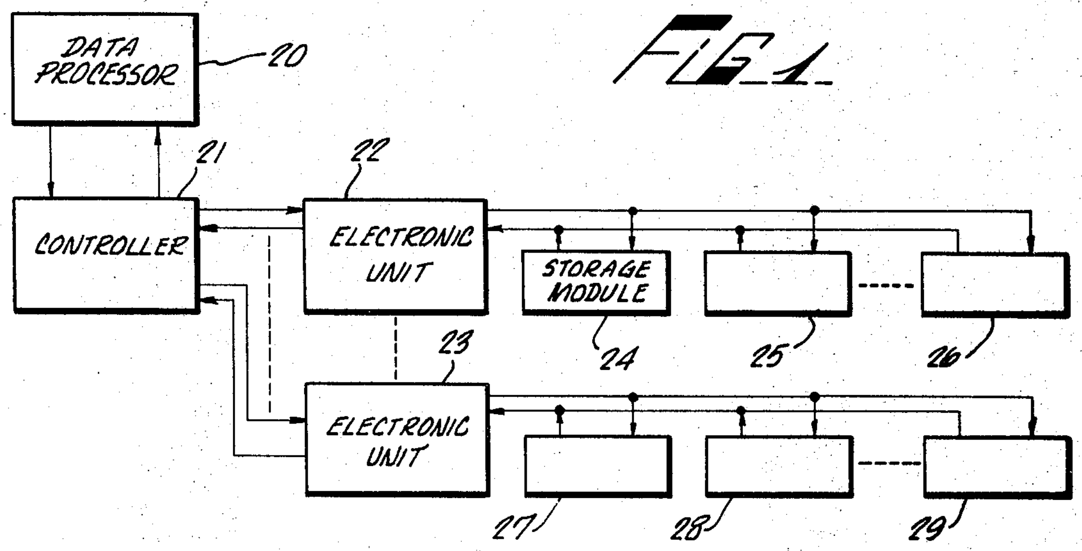
FIG. 1
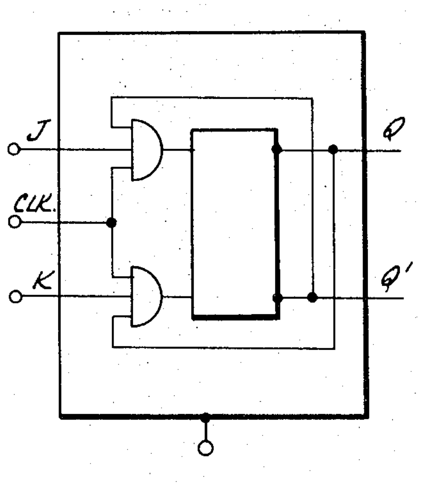
FIG. 4
TRUTH TABLE FOR (JK) F/F
| t Q | | t+1 Q | |
|---|---|---|---|
| 1 | J=1 | 1 | NO CHANGE |
| 0 | ·K=0 | 1 | CHANGE |
| 1 | J=0 | 0 | CHANGE |
| 0 | ·K=1 | 0 | NO CHANGE |
| 1 | J=0 | 1 | NO |
| 0 | ·K=0 | 0 | CHANGE |
| 1 | J=1 | 0 | CHANGE |
| 0 | ·K=1 | 1 | (COMPLEMENT) |
FIG. 4A
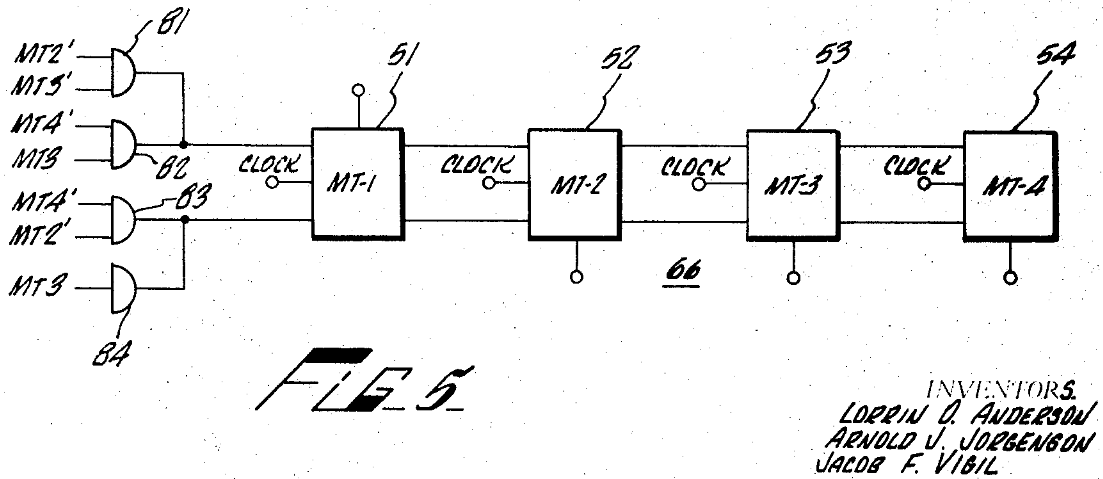
FIG. 5
INVENTORS.
LORRIN O. ANDERSON
ARNOLD J. JORGENSON
JACOB F. VIGIL
BY Christie, Parker & Hale
ATTORNEYS Oct. 27, 1970 L. O. ANDERSON ET AL 3,537,075

DATA STORAGE TIMING SYSTEM

Filed Aug. 14, 1967 8 Sheets-Sheet 2

INVENTORS.
LORRIN O. ANDERSON
ARNOLD J. JORGENSON
JACOB F. VIGIL
BY Christie, Parker & Hale
ATTORNEYS Oct. 27, 1970 L. O. ANDERSON ET AL 3,537,075

DATA STORAGE TIMING SYSTEM

Filed Aug. 14, 1967 8 Sheets-Sheet 3

INVENTORS
LORRIN O. ANDERSON
ARNOLD J. JORGENSON
JACOB F. VIGIL

BY Christie, Parker & Hale
ATTORNEYS

DATA STORAGE TIMING SYSTEM

Filed Aug. 14, 1967 8 Sheets-Sheet 4

INVENTORS.
LORRIN O. ANDERSON
ARNOLD J. JORGENSON
JACOB F. VIGIL
BY Christie, Parker & Hale
ATTORNEYS FIG_5A
| | MT 1 | MT 2 | MT 3 | MT 4 | |
|---|---|---|---|---|---|
| | 1 | 0 | 0 | 0 | BASE |
| FIRST CLOCK | 0 | 1 | 0 | 0 | |
| | 0 | 0 | 1 | 0 | |
| | 1 | 0 | 0 | 1 | |
| | 1 | 1 | 0 | 0 | |
| | 1 | 1 | 1 | 0 | |
| | 0 | 1 | 1 | 1 | |
| | 0 | 0 | 1 | 1 | ← TRANSFERRED |
| | 0 | 0 | 0 | 1 | |
| | 1 | 0 | 0 | 0 | |
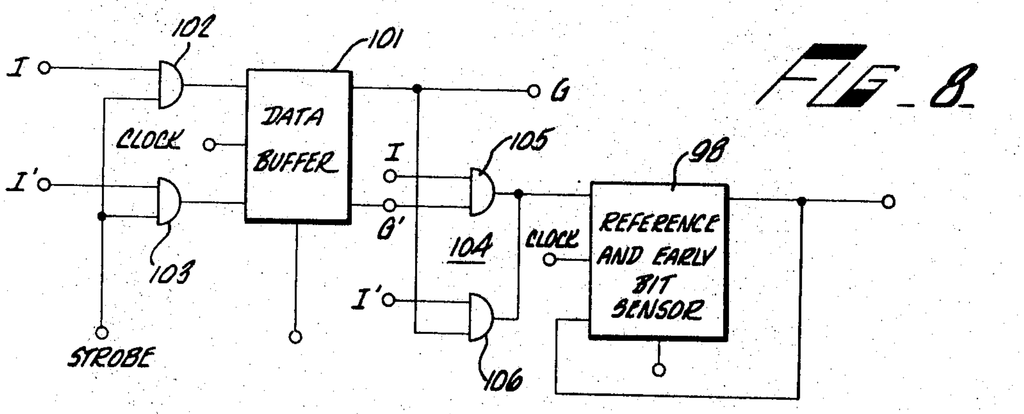
FIG_8
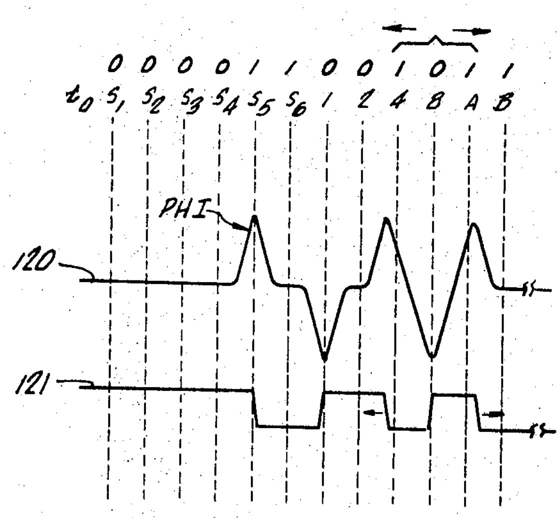
FIG_9
INVENTORS.
LORRIN D. ANDERSON
ARNOLD J. JORGENSON
JACOB F. VIGIL
BY
Christie, Parker & Hale
ATTORNEYS

| DT3 | DT2 | DT1 | |
|---|---|---|---|
| 1 | 0 | 0 | HOME |
| 0 | 0 | 0 | |
| 0 | 0 | 1 | |
| 0 | 1 | 1 | ← STROBE |
| 0 | 1 | 0 | |
| 1 | 1 | 0 | |
| 1 | 1 | 1 | |
| 1 | 0 | 1 | |
| 1 | 0 | 0 | HOME |
| 1 | 0 | 0 | |

INVENTORS.
LORRIN O. ANDERSON
ARNOLD J. JORGENSON
JACOB F. VIGIL
BY Christie, Parker & Hale
ATTORNEYS Oct. 27, 1970 L. O. ANDERSON ET AL 3,537,075

DATA STORAGE TIMING SYSTEM

Filed Aug. 14, 1967 8 Sheets-Sheet 7

INVENTORS.
LORRIN O. ANDERSON
ARNOLD J. JORGENSON
JACOB F. VIGIL
BY Christie, Parker & Hale
ATTORNEYS

United States Patent Office 3,537,075
Patented Oct. 27, 1970

3,537,075

DATA STORAGE TIMING SYSTEM

Lorrin O. Anderson, Covina, Arnold J. Jorgenson, Duarte, and Jacob F. Vigil, West Covina, Calif., assignors to Burroughs Corporation, Detroit, Mich., a corporation of Michigan Filed Aug. 14, 1967, Ser. No. 660,485
Int. Cl. G06f *1/04*
U.S. Cl. 340—172.5 11 Claims

ABSTRACT OF THE DISCLOSURE

A timing system for timing the recovery of data from a magnetic data storage file and for compensating for shifting of recorded data with respect to a recorded clock pulse train wherein the system includes a clock pulse generating source for each zone in which information is stored on the magnetic data storage medium. The generating source produces repetitive voltage pulses at a frequency that is a selected multiple of the frequency at which the information is stored in the associated zone of the magnetic storage medium.

The system further includes the use of the generated repetitive voltage pulses for timing the operation of all subsequent elements in the timing system, which elements include a strobe network for sensing the reference mark that is recorded at the beginning of each record stored in the information tracks of the magnetic storage medium and for selecting one of the voltage pulses from the generator as the most nearly synchronous pulse with respect to the position of the information on the information track being read. The reference mark sensor causes the transfer of the state of a cyclic counter into a storage register which thereafter acts as a reference to indicate the particular pulse from the high frequency source which is most nearly synchronous with the information being retrieved from the information track.

The strobe network further includes an equality gate for comparing the state of the cyclic counter to the state stored in the storage register for triggering a counter to generate a strobe pulse and a reestablished synchronized clock pulse train. The strobe network also includes a comparison device for comparing the transferred data at the output of the strobe network with the incoming data being recovered from the information track for generating an early strobe pulse when the retrieved information occurs early, due to shifting of the voltage peaks at the read heads because of pulse crowding.

BACKGROUND OF THE INVENTION

Field of the invention

This invention relates in general to timing systems and, more particularly, to a system for timing the recovery of data from a magnetic data storage file and for compensating for shifting of recovered data with respect to a recorded clock pulse train.

This invention finds application in the field of information storage and retrieval equipment and, more particulary, finds application in the field of equipment arranged for digital information which is to be stored on and recovered from magnetic memory stores. In one particular nonlimiting embodiment of this invention, the memory store is a disk file system.

DESCRIPTION OF THE PRIOR ART

In memory stores such as drums or disk files, information in the form of magnetically recorded impulses are stored on the drum surface or disk surface which is coated with a film of magnetic material. Each impulse so stored is termed a "bit" of information, and many of these bits are continuously recorded in information tracks. Any store, such as a magnetic disk file, will have numerous tracks of information. A magnetic disk file is more fully described in an application Ser. No. 649,752, filed Mar. 13, 1967, entitled Information Address Recording and Retrieval System, now Pat. No. 3,375,507, issued Mar. 26, 1968 and assigned to the same assignee as the present application.

In the referenced Pat. 3,375,507, magnetic disks, each having three separate data or information zones, are described. Data in the form of binary bits is stored in each information zone. Each information zone has a frequency different from the other zones so as to allow more efficient data handling. In accordance with the technique described in the referenced application, a clock track is also provided on the disk for each information zone. The clock data takes the form of repetitive binary bits having the same predetermined frequency of repetition as the information data or bit cell or bit period in the associated information zone. The bit periods for each zone are of different duration in keeping with the different frequency of each zone. Accordingly, each clock track has a bit period which is suitable for clocking data relative to its own associated information zone.

The data is stored in a particular zone under the control of the clock for that zone. However, by the time the data is to be recovered from the magnetic storage medium, which may be a disk, the bit periods in the selected information track may be asynchronous relative to the clock for that zone. That is, the bit locations in the information zone may become shifted in phase relative to their original position at the time of storing and, therefore, relative to the clock for that zone because of such factors as disk jitter, temperature changes, head skew, head gap variations, and variations in the distance between the storage medium and the read/write head, as well as other unpredictable factors which cannot be wholly eliminated from a magnetic storage system such as a disk file system. These problems are present in both fixed head systems, and even more so in movable head systems.

In the prior art systems for compensating for the asynchronous nature of the binary bits, a plurality of pulse trains having a particular phase relationship with respect to the recovered clock pulse train are generated. One of these pulse trains is then selected as being the closest to the bit period of the asynchronous data bits. This selected pulse train is thereafter used to clock the transfer of the data. Such a system is described in an application Ser. No. 584,049, filed Sept. 29, 1966, entitled Timing Arrangement for Generating Plural Phases, and assigned to the same assignee as the present application. These systems employ delay circuits for the generation of the plurality of pulse trains and generally there are only three or four phases within a bit period from which to select for use as a new, more closely synchronous clock for the transfer of data.

It has been found that the prior art systems using a plurality of pulse trains generated by delay circuits are relatively slow in response and that the new clock pulse train is not consistently generated with the selected phase, but is randomly dependent upon other phases. Additionally, the dividing of the bit period into only three or four parts leaves too wide an area for error.

The data storage in magnetic storage systems is often accomplished by employing a version of the non-return-to zero (NRZ) method of recording. This and other methods of recording on magnetic surfaces are generally described in "Digital Computer Components and Circuits," R. K. Richards, published by De Van Nostrand Company, Inc., at pages 314–350. Taking the NRZ method of recording as an example, a binary "1" appearing after a binary "0" is represented by a change in the direction of magnetization on the recording medium, a binary "0"

appearing after a binary "1" is represented by a change in magnetization in the opposite direction, and a succession of ones or zeros after the first in a series is represented by magnetization in the same direction with no change. When there are a number of successive changes in direction of magnetization, the first and last change, even though occurring at the proper time during writing of the data, will respectively result in an early occurring data bit and a late occurring data bit upon recovery. When recovering the recorded data, the first change in a series will appear as a peak, which is shifted early relative to the clock bit period in which the binary bit was recorded. Similarly, when recovering the data, the last change in a series of magnetization changes will appear as a peak shifted late relative to the clock bit period in which the binary bit was recorded. The peaks developed during recovery between the first change and the last magnetization change in a series will not be shifted but will appear in their true position relative to the clock bit period in which the intermediate binary bits were recorded. The relative shift is a result of the different directions of magnetization inducing voltages with opposite polarities in the coils of the read head and the algebraic summation of the first polarity with the second in a series. This shift is even more pronounced in high density systems. It is common practice to press the limits of the state of the art in packing densities for data bits in each of the storage zones on the medium. Because of this the shift can easily be great enough to cause a false reading or loss of a bit. Other than the system disclosed and claimed in the concurrently filed application Ser. No. 660,383 by Michael L. Behr and assigned to the assignee of this application, there are no systems known to the applicants that in any way compensate for this shifting of the binary data bits in a series of data bits that alternate between a binary "1" and a binary "0" for the NRZ method of recording or for the shifting of the peaks at the beginning and at the end of a series of magnetic field changes in other methods of recording.

SUMMARY OF THE INVENTION

The foregoing disadvantages of the prior art are avoided in accordance with the principles of this invention wherein a strobe unit includes a clock pulse train generating source for each information zone which generates a single clock pulse train at a frequency that is a selected multiple of the frequency of the recorded clock pulse train for the associated zone. The frequency of the clock pulse train generated by the source may be easily adjusted to almost any selected multiple of the frequency of the associated clock pulse train. For example, the source may generate a clock pulse train that is nine times the frequency of the recorded clock pulse train so that the clock bit period, which is the same as the data bit period in the associated zone is effectively divided up into nine sub-parts to provide a closer control of the clocking of the recorded data on recovery to compensate for any shift between the data recovered from the information tracks and the associated recorded clock. In this manner, the timing system is considerably faster than the prior art systems that relied on delay circuits. Additionally, the disadvantages of the prior art are avoided in accordance with the principles of this invention by employing an isolated strobe network that is responsive to a reference bit with no changes in direction of magnetization in the immediately preceding and succeeding bits periods. This reference bit is recorded at the beginning of each record on the informattion track. The strobe network selects the pulse of the clock pulse train generating source representing the sub-part of the bit period that is most closely synchronous with the stored data as represented by the true position reference bit. The selected pulse in the bit period is used to generate a new synchronous clock pulse train for all further transfers of data. This strobe network of the present invention accomplishes this by employing a storage register which acts as a reference by storing information which identifies the selected pulse in the bit period so that the clock generating portion of the strobe network which is responsive only to signals at the selected sub-part of the bit period will generate a properly timed clock pulse train and a properly timed strobe pulse for transferring the recovered data. Further, the data bits that are shifted early on recovery are compensated for by employing an override network that permits the early generation of the strobe pulse for strobing the early data bits closer to the middle of the bit period rather than at the usually noisy ends of the bit period.

DESCRIPTION OF THE DRAWINGS

The above and other features and advantages of the present invention may be understood more fully and clearly upon consideration of the following specification and accompanying drawings in which:

FIG. 4 is a block diagram of one of the elements used in the strobe network of FIG. 3;

FIG. 4A is a logic truth table for the element of FIG. 4;

FIG. 5 is a detailed block diagram of a cyclic counter in the strobe network of FIGS. 3A and 3B;

FIG. 5A is a logic truth table for the cyclic counter of FIG. 5;

FIG. 7 is a detailed logic diagram of the delay timer in the strobe network of FIGS. 3A and 3B;

FIG. 7A is a logic truth table for the delay timer of FIG. 7;

FIG. 8 is a block and logic diagram of a comparison circuit in the strobe network of FIGS. 3A and 3B for compensating for shifting of recorded data in accordance with the present invention;

FIG. 9 is a timing chart showing the first information character in a word following a 6-bit space after which a reference pulse is recorded in accordance with the present invention and showing the shifting of the data bit upon recovery.

DESCRIPTION OF A PREFERRED EMBODIMENT

Figures 1, 1A, 6:
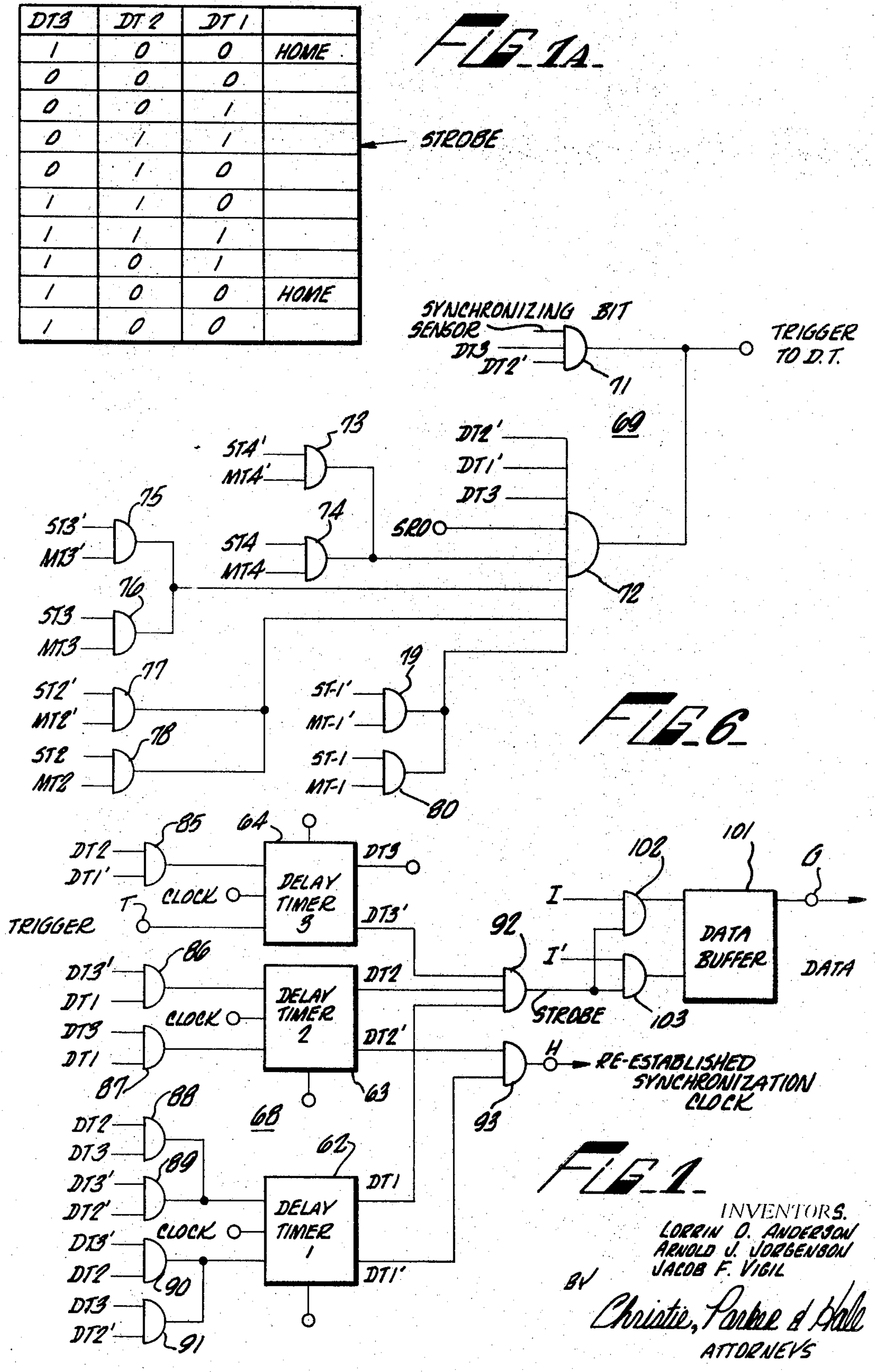
FIG. 1 is a block diagram of a data storage and retrieval system in which the present invention has particular applicability.
FIG. 6 is a detailed logic diagram of the gating circuitry for triggering the delay timer in the strobe network of FIGS. 3A and 3B.

In FIGS. 1, there is shown a block diagram of a basic digital data storage and retrieval system. The system includes a data processor 20, a controller 21, and a plurality of electronic units associated with controller 21. Only two electronic units 22 and 23 are shown. However, it is to be understood that others may also be employed in the system depending upon the capabilities of controller 21. Associated with each electronic unit is a pulurality of storage modules. For example, with electronic unit 22 there is shown storage modules 24, 25, and 26. Similarly, with electronic unit 23 there is shown storage modules 27, 28, and 29. The storage modules may include magnetic memories and, in particular, these memories may be disk files. In one application, each storage module contains four disks and the electronic unit is capable of handling at least five modules or twenty disks. In this particular application, the controller is designed to handle ten electronic units and, thus, can handle up to two hundred disks.

The particular disk on which data is to be stored or retrieved is selected by data processor 20 through controller 21.

Figure 2:
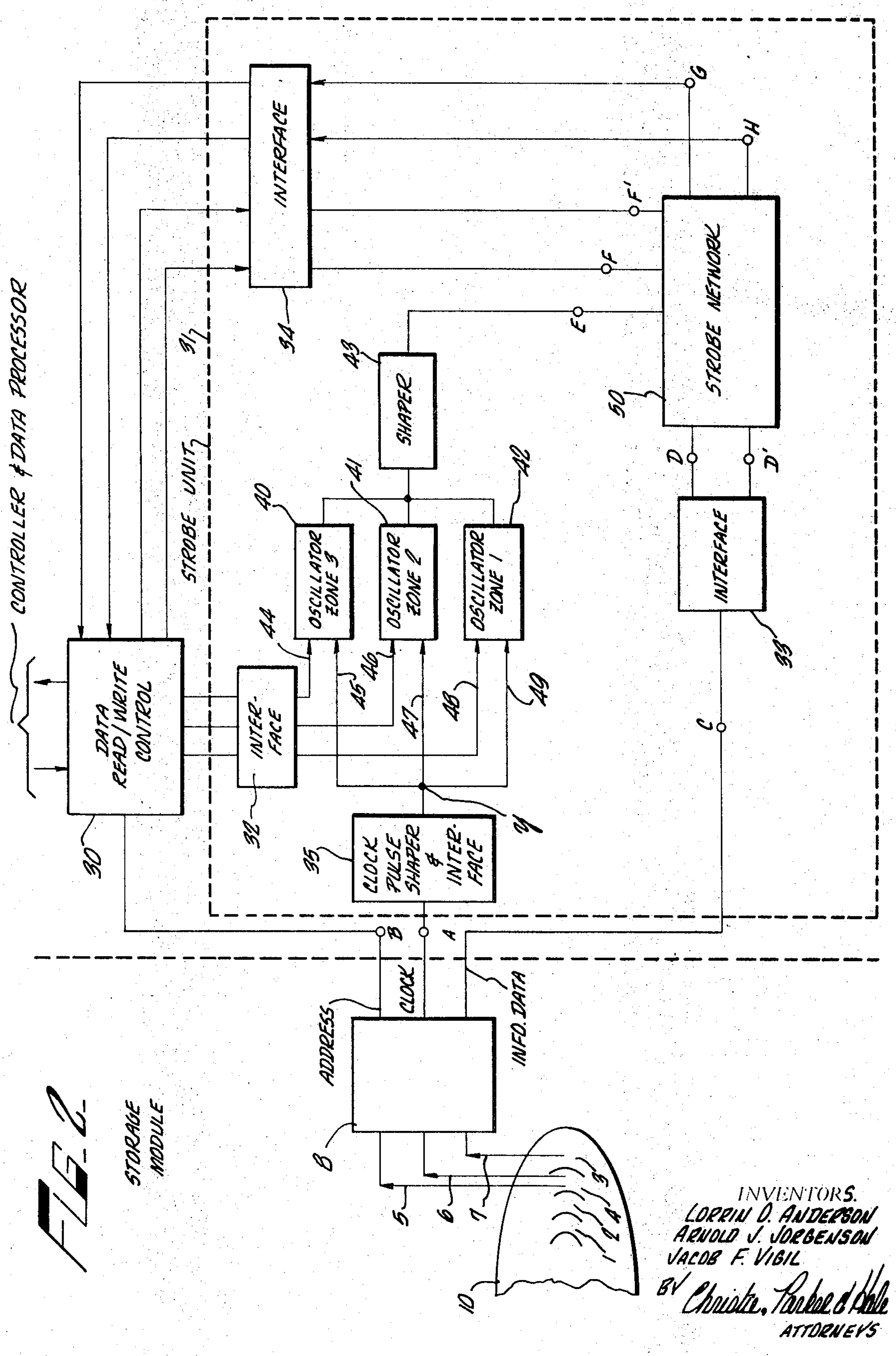
FIG. 2 is a detailed block diagram of the timing system in accordance with the present invention.

The timing system for the data storage and retrieval system in accordance with the present invention is shown in block form in FIG. 2. In this particular example of the applicability of this invention, the storage medium is a magnetic disk file, although the invention is in no way limited to this type of storage medium for it is equally applicable to the recovery of data from magnetic drums or magnetic tapes. However, a magnetic disk file will be employed in describing the invention. A portion of such a file 10 is diagrammatically shown in FIG. 2. As described in the above-referred to Pat. No. 3,375,507, such a disk file has a plurality of information tracks grouped to form zones. These zones are generally shown in FIG. 2 as zones 1, 2, and 3. A fourth zone, zone 4, is shown in FIG. 2 on disk file 10, and this zone includes the address and clock track for each of the information zones. Thus, zone 4 contains six tracks, three clock tracks and three address tracks, a clock track and an address track being paired for each information zone. The read/write heads associated with disk file 10 are not shown in FIG. 2, but the retrieval of information is generally shown by lines 5, 6, and 7, line 5 being associated with the address track, line 6 being associated with the clock track, and line 7 being associated with the information track.

It is assumed, for purposes of illustration, that the information is being retrieved from zone 3 of disk file 10, and that the address and clock track associted with zone 3 is also being read. The amplifying and shaping elements associated with the read/write heads are located in storage unit 8. Storage unit 8, together with disk file 10 and the read/write heads, makes up one part of a storage module, for example, storage module 24 of FIG. 1.

An electronic unit generally shown to the right of the dashed line in FIG. 2 is associated with storage unit 8. The electronic unit receives input signals from the controller and data processor by way of the controller, both of which are not shown in FIG. 2. The timing signals, derived in accordance with the present invention, are derived in the electronic unit which is shown in block form in FIG. 2. The electronic unit generally includes a data read/write control 30 and a strobe unit 31. The data read/write control 30 selects the storage module, disk file, face of the disk file and zone of the disk file, and an information track in that zone from which the data is to be retrieved. This operation and the apparatus for performing the selection and retrieving are described in the above-referenced Pat. No. 3,375,507. In conjunction with the data read/write control 30, there is, as part of the electronic unit, a strobe unit 31 that generates a synchronized clock pulse train to compensate for the shifting of the data bits in the information track with respect to the clock pulse train in the associated clock track and also controls the transfer of the recovered data from the recording medium to the controller and data processor.

In the system of FIG. 2, there are included a plurality of interface elements to convert the signal levels that are applied to the strobe unit to levels that are acceptable to the elements in the strobe unit. These interface elements 32, 33, 34, and part of 35, are only needed where the preceding circuitry is, for example, transistor logic, while the strobe unit circuitry is, for example, CTL logic.

It is assumed, for purposes of illustration, that an information track in zone 3 of disk 10 contains the information to be retrieved. It is known that in disk files the information stored in the different information zones has a bit period or repetition rate dependent upon the zone in which the information is stored. For example, the bit frequency of the three zones of disk 10 may advantageously be 1 megacycle for zone 1, 1.5 megacycles for zone 2, and 2 megacycles for zone 3. Thus, the information being retrieved from zone 3 would have a maximum bit frequency or repetition rate of 2 megacycles. The data retrieved from the selected information track and the associated clock and address tracks are shown in the time chart of FIGS. 10 and 10A. The data retrieved from the clock track for zone 3 is shown as curve A, the data retrieved from the address track for zone 3 is shown as curve B, and the information data retrieved from the selected information track of zone 3 of disk 10 is depicted as curve C in FIGS. 10 and 10A. The curves of FIGS. 10 and 10A begin at the beginning of a record on the selected information track and the first character plus six preceding spacer bits for the selected record are shown in FIGS. 10 and 10A.

Figure 10:
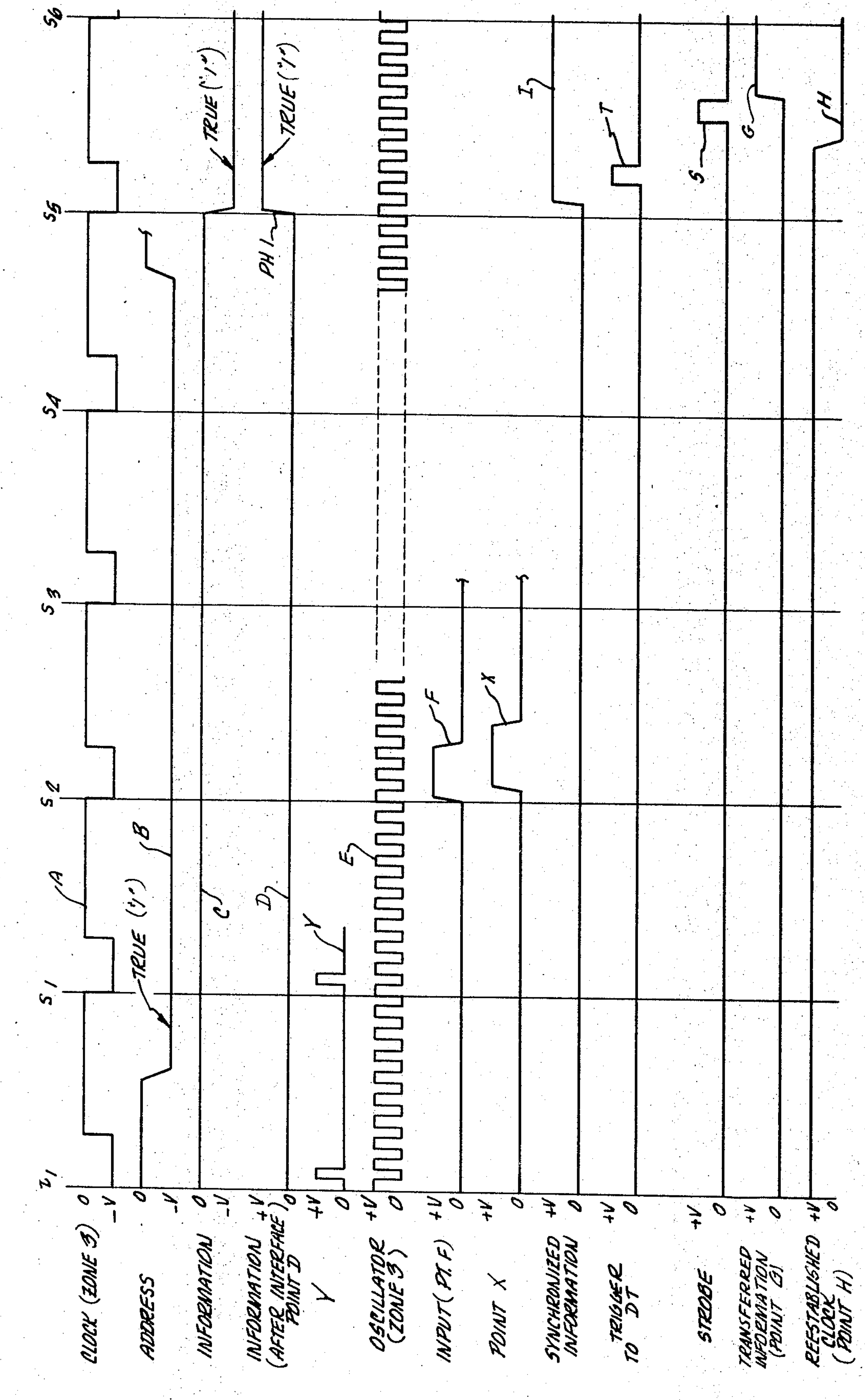
FIGS. 10 and 10A, taken together, as a timing chart setting forth the wave forms in the timing system which timing chart is useful in promoting a clearer understanding of the operation of the circuitry.
Figure 10A:
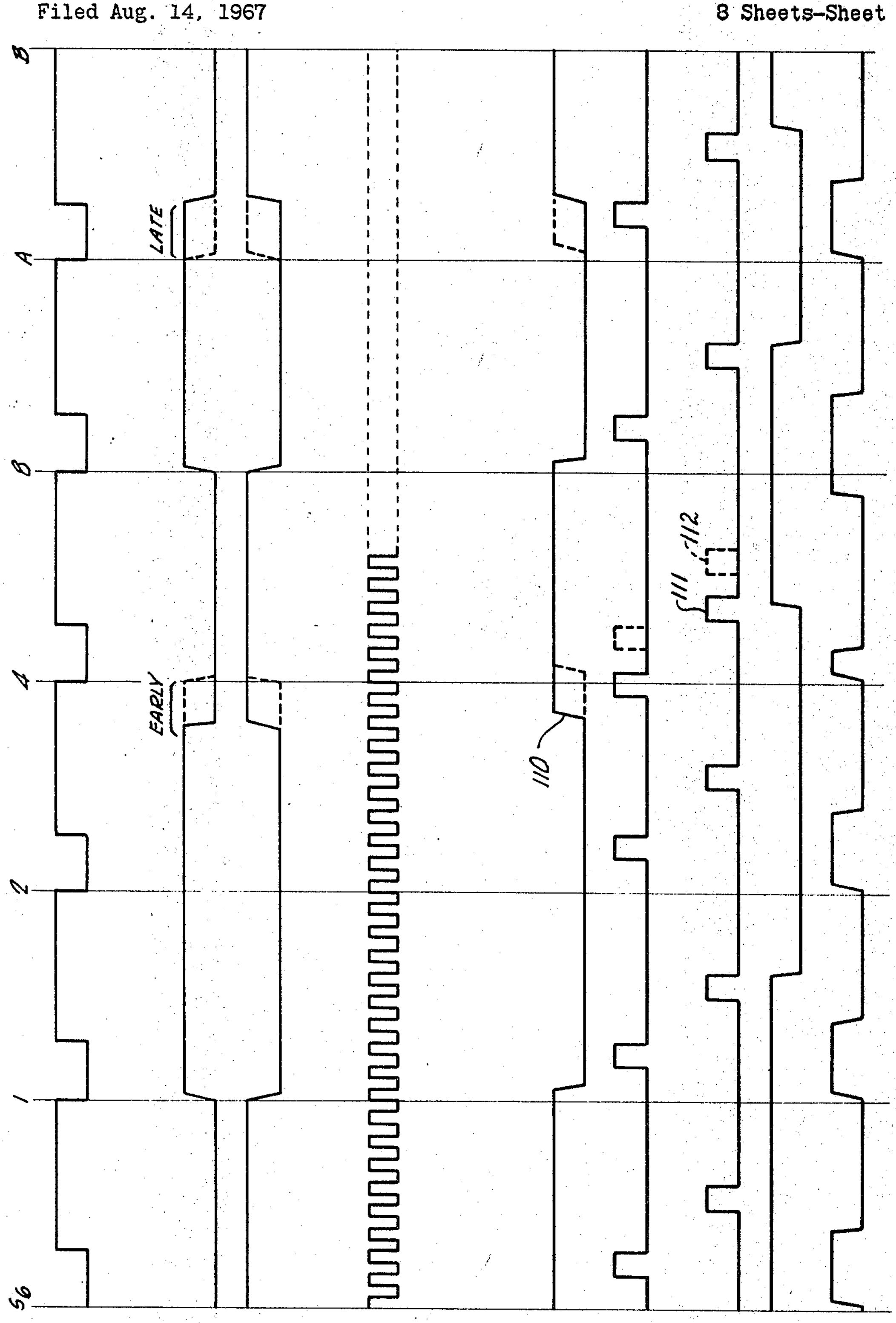

The operation of interface 33 in FIG. 2 is more clearly shown by a comparison of curves D and C in FIGS. 10 and 10A, curve C representing the information retrieved from the information track and curve D representing the information after passing through the interface 33 and appearing at point D in FIG. 2. For purposes of illustration, it is assumed that the information retrieved from the disk file after passing through the read amplifiers and shapers located in storage unit 8 has a voltage level of approximately −4.5 volts to represent a binary "1" and a logic true and a voltage level of "0" volts to represent a binary "0" and a logic false. After the interface, it is assumed that the voltage level of approximately +2.5 volts represents a binary "1" and a logic true and a voltage level of "0" volts represents a binary "0" and a logic false. This is generally shown by curves C and D in FIGS. 10 and 10A. Thus, it is seen that throughout the strobe unit 31 on the strobe network side of the interfaces a binary "1" and a logic true are represented by a plus voltage and a binary "0" and a logic false are represented by a zero voltage by the curves in FIGS. 10 and 10A.

In accordance with the present invention a single higher frequency clock pulse train is generated for each information zone, with only the clock pulse train associated with the selected information zone being generated at any one time. The generated clock pulse train has a frequency that is a selected multiple of the frequency or repetition rate of the recovered clock pulse train for the selected zone to effectively divide the bit cell or bit period into a selected number of sub-parts.

The single higher frequency clock pulse train is generated by oscillators 40, 41, and 42 shown in FIG. 2. Each oscillator is associated with a particular information zone of the disk files and has an output signal at a frequency that is the selected multiple of the frequency of the bit periods of the associated zone. For example, oscillator 40 is associated with zone 3 and when the selected multiple is 9, for example, the output frequency of oscillator 40 will be 18 megacycles. Similarly, the output frequency of oscillator 41 which is associated with zone 2 will be 13½ megacycles and the output frequency of oscillator 42 which is associated with zone 1 will be 9 megacycles. The output of the selected oscillator 40, 41, or 42 is coupled to a strobe network 50 through a pulse shaper 43. In this case, it is assumed that information is being retrieved from zone 3 of disk file 10 so that the output signal is derived from oscillator 40 and has a frequency of 18 megacycles. The clock pulse train that appears at the output of shaper 43 is shown as curve E in FIGS. 10 and 10A. It is seen from FIGS. 10 and 10A that, during one bit period, for example, between S1 and S2, the output of shaper 43 is a pulse train having nine pulses. Thus, if any one of these pulses is selected as a timing reference, it is possible to have an accuracy far superior to the accuracy possible in the prior art system where only three or four pulse trains are generated and the bit cell is divided into only three or four parts rather than a greater number of parts, such as nine parts. Additionally, the timing system of the present invention is not only more accurate but it is faster in operation since a single pulse train is generated and the pulse train is immediately available as contradistinguished from the prior art system, where a plurality of pulse trains are derived through the use of delay circuits.

It is seen from FIG. 2 that the clock pulse train A that is recovered from the clock track associated with zone 3 appears only at the input to clock pulse shaper 35. After passing through the shaper 35 the recovered clock pulse train or a derived pulse train having the same repetition rate appears at point Y as an input to each of the oscillators 40, 41, and 42. The clock pulse shaper 35 produces a single pulse of a controlled width for each clock pulse that is recovered from the clock track. The clock pulse train that appears at the output of clock pulse shaper 35 and at point Y is shown as curve Y in FIGS. 10 and 10A. This clock pulse train is employed to synchronize the output generated by one of the oscillators 40, 41, or 42 which in this case is the output of oscillator 40. Oscillators 40, 41, and 42 are of the type disclosed and claimed in the concurrently filed application Ser. No. 660,484 by Frank W. Weber and assigned to the assignee of this application. These oscillators have the ability to readily start and stop in response to the clock pulse at point Y. Also these oscillators operate at a high frequency and are readily controllable by a short pulse, such as a 25 nanosecond pulse. The oscillators will not produce an output when a true signal appears at either one of the two input terminals 44 and 45 for oscillator 40, 46 and 47 for oscillator 41, and 48 and 49 for oscillator 42. The oscillators are made up of a relatively low Q tuned circuit comprising a series-connected inductor and capacitor in conjunction with a variable passive element for making the frequency of oscillation variable. A regenerative signal is fed to the tuned circuit by an inverter and high gain emitter follower. The inverter is connected between the low Q tuned circuit and the emitter follower which functions as a current gain amplifier. A voltage responsive switch is connected between ground reference and the output of the inverter and the input of the emitter follower. Thereafter, upon the application of a voltage pulse, and in this case a positive voltage pulse, the voltage responsive switch will inhibit the output of the oscillator. Upon subsequent removal of the voltage pulse the inverter will again produce an output of repetitive voltage pulses that will begin substantially at the time of removal of the inhibiting voltage pulse. In this application the inhibiting voltage pulse is the clock pulse at the output of the clock pulse shaper 35 which effects synchronization of the clock pulse train generated by the oscillator with the recovered clock pulse train from the storage medium. Thus, oscillator 40 is selected to generate the clocking pulses by applying a false signal to terminal 44 and a true signal to terminals 46 and 48 through the data read/write control 30. This is accomplished when the zone of the disk to be read from is selected by the controller and data processor.

Figure 3A:
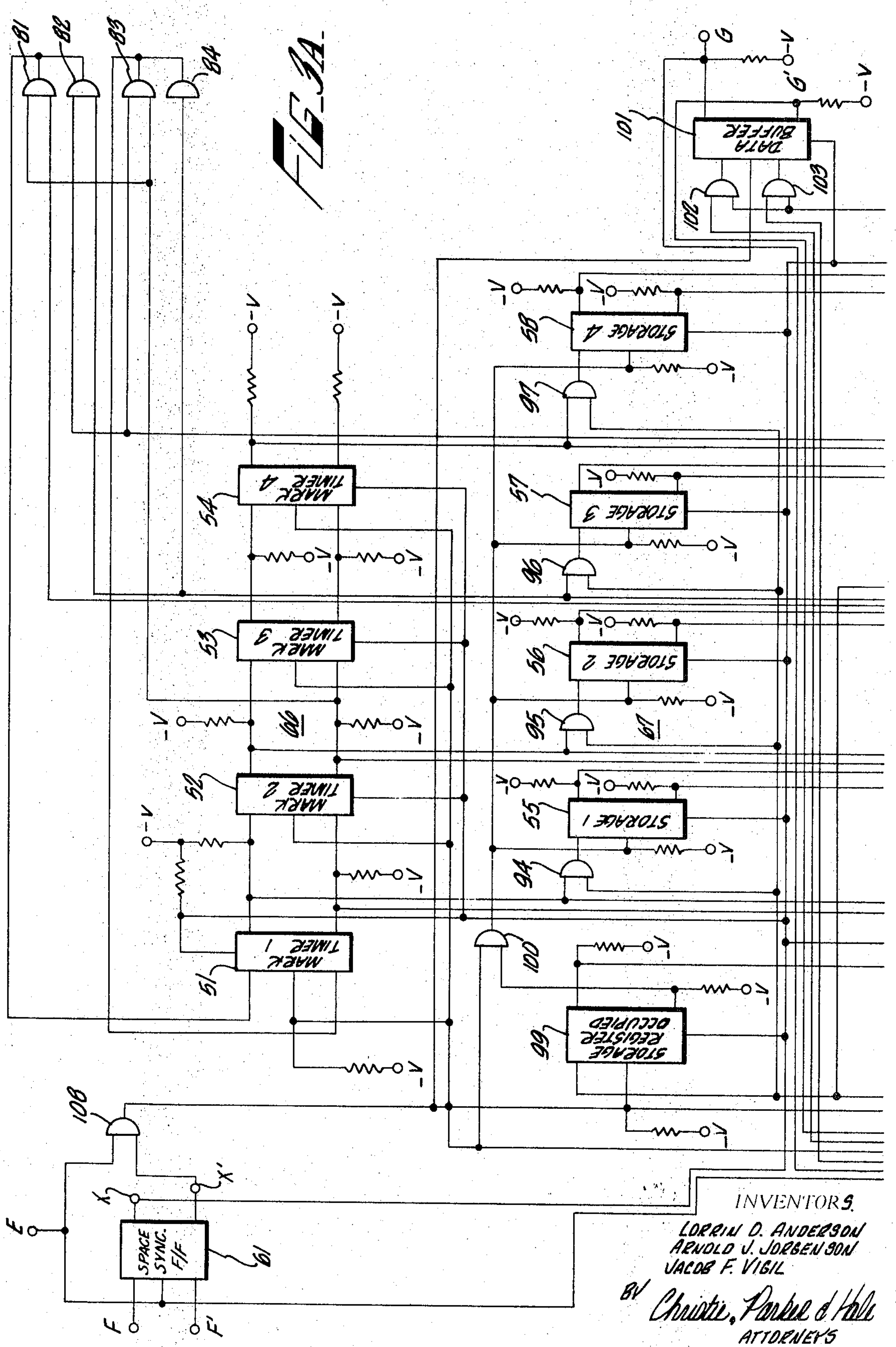
FIGS. 3A and 3B are, taken together, a detailed block and logic diagram of the strobe network of FIG. 2 in accordance with the present invention.
Figure 3B:
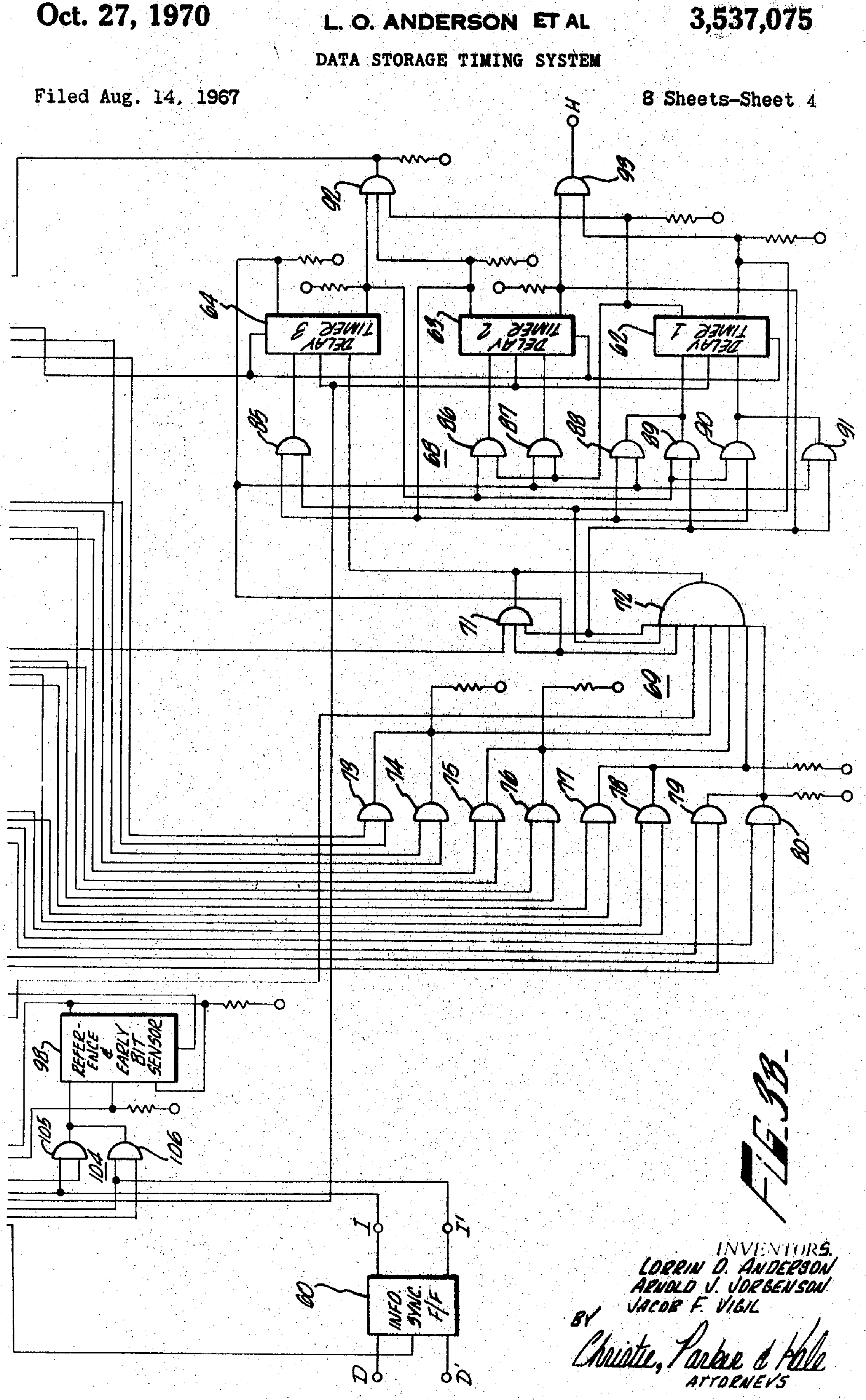

The remainder of the timing system is contained in strobe network 50, a detailed diagram of which is shown in FIGS. 3A and 3B. All of the clocking in the strobe network 50 is done by the high frequency clock pulse train generated by one of the oscillators, such as oscillator 40. The strobe network illustrated in FIGS. 3A and 3B includes a cyclic counter 66 comprised of timers 51, 52, 53, and 54, which timers are shift registers made up of flip-flops. The cyclic counter 66 is shown separately in FIG. 5, and the truth table for this counter is shown in FIG. 5A. The strobe network further includes a storage register 67 which is made up of storage elements 55, 56, 57 and, which are flip-flops. Also included in the strobe network are two synchronizing flip-flops 60 and 61 for synchronizing the incoming signals to the strobe network with the high frequency clock generated by oscillator 40. Further, in the strobe network there is provided another counter 68 made up of delay timers 62, 63, and 64, which are further made up of flip-flops. Counter 68 is shown separately in FIG. 7. Delay counter 68 is triggered by a gating network 69 made up of AND gates 71, 72, and 73–80.

The strobe network 50 further includes AND gates 81, 82, 83, and 84 as a part of cyclic counter 66 and AND gates 85–91 as a part of delay counter 68.

Both the strobe pulse (curve S, FIGS. 10 and 10A) for transferring the data recovered from the information track (curve G, FIGS. 10, and 10A) and the synchronized reestablished clock pulse train, appear at the output of delay counter 68 and are gated through AND gates 92 and 93, respectively.

The input to storage register 67, which stores the state of cyclic counter 66, is gated into storage register 67 through AND gates 94–97, inclusive. The transfer from the cyclic counter 66 to the storage register 67 is accomplished under the control of reference and early bit sensor 98. Only one transfer per record is permitted between the counter 66 and the register 67 because of the operation of a storage register occupied element 99 cooperating with AND gate 100 to open the circuit for the clocking signals to the storage register 67.

The digital information of the recovered data from the selected information track, which is applied to the strobe network 50, at points D and D′ is transferred through the network 50 is stored in data buffer 101 and appears, upon transfer at the output of this buffer. The input to the buffer 101 is gated through AND gates 102 and 103 by the generated strobe signal from timer 68.

The incoming recovered information data and the transferred data at the output of data buffer 101 are compared in Exclusive OR gate 104 made up of AND gates 105 and 106, at the input to reference and early bit sensor 98 (FIG. 8).

The strobe network further includes an AND gate 108 that cooperates with the output of the space synchronizing flip-flop 61 for inhibiting the application of the high frequency clock signal to the strobe network so that the network may be cleared in preparation for the application of the next record that is retrieved.

In the preferred embodiment shown in FIGS. 3A and 3B, the rectangular boxes represent flip-flops that have a particular operation which is better understood by reference to FIGS. 4 and 4A. The flip-flops have three input terminals on the left and two output terminals on the right. The input terminals are the J terminal, which is the uppermost terminal, and the K terminal, which is the bottommost terminal. The terminal between the J and K terminals is a terminal provided for the application of a clock pulse and is designated the clock terminal. The output terminals on the right side of the rectangular box are designated Q and Q′ where Q′ has a signal that is the inverse of the signal appearing on terminal Q. The upper terminal or Q terminal is hereinafter also called the primary output terminal and the lower terminal or Q′ terminal is called the secondary output terminal. This particular flip-flop has been termed a complementary flip-flop with the operating characteristics being shown in the truth table set forth in FIG. 4A. The left-hand column is the condition of the Q output terminal at the time *t* before the application of a clock pulse to the input of the flip-flop. The right-hand column sets out the condition of the Q terminal after the clock pulse has been applied to the flip-flop when the other two input terminals, i.e., the J and K terminals, have the binary input shown in the middle column of the truth table of FIG. 4A. The flip-flop changes state at the end of the positive clock pulse or as the clock input changes from a positive voltage (true) to zero volts. In the flip-flops of FIGS. 3A and 3B, there is also a terminal at either the top or the bottom of most of the flip-flops. A terminal coming into the top of the flip-flop indicates that a "1" on that terminal will set the flip-flop to a "1" or a logic true. In this condition, a "1" appears at the Q or the uppermost right-hand side terminal of the flip-flop. A line coming into the bottom of the flip-flop indicates that a "1" on this line will reset the flip-flop to a zero so that a zero appears on the Q terminal of the flip-flop.

With the designation of the elements as set out above, the operation of the timing system can now be easily understood. When the information track to be read from is selected, the data read/write control 30 will apply an enabling signal to the appropriate read/write heads through the storage unit 8. In this example, it is assumed that the information to be read is located in zone 3 of disk 10. With the enabling of read/write heads associated with the particular information track of the selected zone, the data stored in the selected information track and the associated address and clock tracks will be retrieved and will appear as binary information at points A, B, and C, as shown in FIGS. 10 and 10A. With the selection of the information track to be read and the zone in which the track is located, the data read/write control 30 will select the appropriate oscillator from oscillators 40, 41, and 42. The oscillators produce an output when a false signal appears at both input terminals to the oscillator. Therefore, a true signal is applied to one of the input terminals of two of the oscillators by the data read/write control 30 while a false signal is applied to the input terminal of the third oscillator. In this case, a true signal is applied to terminals 46 and 48, and a false signal to terminal 44. In this manner oscillator 40 produces an output. The output of oscillator 40 is synchronized with the recovered clock pulse train in the following manner. The recovered clock pulse train appears at point A and, after passing through the clock pulse shaper and interface 35, appears at point Y as a series of pulses having a repetition rate equal to the repetition rate of the recovered clock pulse train, as shown in curve Y of FIG. 10. The output of clock pulse shaper 35 is a synchronizing pulse of short duration and appears as a binary "1" or a logic true at the input to all of the oscillators. In this way, the oscillator that is selected by the data read/write control 30 will have a true signal applied to one input terminal to stop the operation of the oscillator so that, when the oscillator again begins to produce an output, the output signal will be synchronized with the recovered clock. The output of the synchronized oscillator is then applied to strobe network 50 as a synchronized high frequency pulse train shown as curve E in FIGS. 10 and 10A and in this case the the oscillator output is at a frequency that is nine times the frequency of the recovered clock so that the bit period is divided into nine parts. This synchronized high frequency clock pulse train to the strobe network 50 in place of the recovered clock pulse train.

In preparation for the reading of a new record, the strobe network 50 is first cleared and placed in a ready condition for the application of the recovered information. To provide for this clearing function, a particular combination of data bits having a prescribed pattern is recorded on the address track of the disk file which is associated with the zone from which the information is being recovered. The recovery of this particular pattern from the address track in the data read/write control 30 results in the generation of a pulse at input terminals F and F′ of the strobe network so that indicates the reading of a new record from the disk file. This input signal is applied to the synchronizing flip-flop 61 which synchronizes the incoming pulse with the high frequency clock pulse, as shown by curves E, F, and X in FIGS. 10 and 10A. The synchronized pulse appearing at point X at the output of space synchronizing flip-flop 61 is applied to all of the flip-flops to either set or reset the flip-flops in preparation for the application of the recovered information data. When a binary "1" appears at point X, a binary zero appears at point X′, which binary zero is applied to one terminal of AND gate 108. The high frequency clock pulse train is applied to the other terminal of AND gate 108. It is seen that the high frequency clock pulse train is applied to all of the elements in the strobe network through AND gate 108 except for the synchronizing flip-flops 60 and 61. Thus, when a binary zero appears at point X′, the high frequency clock pulse train will be inhibited and the strobe network will be cleared unclocked.

After the strobe network is cleared, the output terminal X from the synchronizing flip-flop 61 will have a binary zero and the terminal X′ will have binary "1" to enable gate 108 to permit the application of the high frequency clock pulse train to the elements in the strobe network.

After clearing the strobe network is ready for the application of the data recovered from the information track. The information itself is utilized to advantage in defining the data locations and selecting one of the pulses of the high frequency clock as the one that is most nearly synchronous with the recovered information. In order to accomplish this selection of the most nearly synchronous pulse, a synchronizing mark is written on the information track and is separated from the first data signal of the record by one bit period in which no change in direction of magnetization takes place. This synchronizing mark, sometimes hereinafter called a "phi" bit, or a reference bit, is present in each record in each track of each information zone and is separated from the first bit of information for each record by one bit period in which no magnetization change takes place to provide an uncrowded true reference for each record. The reference bit gives a true indication of the position of the information bits because disk vibration or rotational shifts that cause shifting between the bit cells in the clock track and in the information tracks does not disturb the position of the reference mark relative to its associated information. It is seen from curve D in FIGS. 10 and 10A that a plurality of zero bits appear at the beginning of the record and prior to the reference or phi bit. The reference bit appears as a logical true and, assuming the NRZ method of recording, the true will have been recorded as a change in direction of magnetization on the magnetic memory and will be followed by no change so that there will be no crowding or shifting of the reference mark on recovery with respect to its recorded position.

The recovered information, depicted as curve D in FIGS. 10 and 10A, will be applied to terminal D with the inverse being applied to D′ of the information synchronizing flip-flop 60 in strobe network 50. The logic true or binary "1" appearing on terminal D will set the flip-flop 60, at the end of the next pulse from the high frequency clock, which appears at terminal E in FIG. 3A. This is shown more clearly in FIGS. 10 and 10A. The synchronized information appears as curve EI in FIGS. 10 and 10A and, from this curve, it is seen that the termination of the first pulse of the high frequency clock pulse train (curve E) occurring in the bit period between S5 and S6 triggers the synchronizing flip-flop 60. The binary "1" appearing at the output terminal I of flip-flop 60 is applied to AND gate 105 of the Exclusive OR gate 104 and the binary zero appearing at the output of I′ of flip-flop 60 is applied to AND gate 106 of the Exclusive OR gate 104. The other inputs to the AND gates 105 and 106 come from the data buffer 101. The relationship of the data buffer 101, Exclusive OR gate 104, and reference and early bit sensor 98 may be seen more clearly by reference to FIG. 8.

Before the occurrence of the reference mark phi, flip-flops 101 and 98 were set to their zero state during the clearing period of the record. With the appearance of the binary "1" or logic true at terminal I, it will be combined with a binary "1" existing at terminal G′ at the output of data buffer 101. Thus, the signal at both input terminals of AND gate 105 are true and a binary "1" will appear at the input to reference and early bit sensor 98. Since AND gates 105 and 106 combine to form an Exclusive OR gate 104, it is necessary to consider the state of the input terminals to AND gate 106. If the inputs to AND gate 105 are both ones, then the inputs to both terminals of AND gates 106 are binary zeros so that the condition for the Exclusive OR gate is satisfied and a binary "1" or true appears at its output.

Reference and early bit sensor 98 was set in its zero state initially during the clearing stage so that a binary "1"

appearing at its input will set this flip-flop upon the termination of the next clock pulse from the high frequency clock. The output of the reference and early bit sensor 98 is applied to the storage register occupied flip-flop 99 and at one of the terminals of AND gates 94, 95, 96, and 97 and AND gate 71.

Prior to the occurrence of the reference mark, the cyclic counter 66 is in operation. The operation of this counter can be seen more easily by reference to FIGS. 5 and 5A. The counter is set in the state of 1000 by the clearing pulse appearing at terminal X of space synchronizing flip-flop 61 and thereafter begins to count each pulse from the high frequency clock, which clock is applied to the middle terminal of each flip-flop in the counter.

The cyclic counter 66 has nine steps or nine states. The cyclic counter is made up of four flip-flops 51, 52, 53, and 54, which are interconnected to provide nine steps out of the possible 16 that a four-stage counter is capable of producing. It is seen from curves E and X in FIGS. 10 and 10A that the pulse X employed for clearing the strobe network 50 exists between the first and fourth pulses of the high frequency clock. Thus, the cyclic counter 66 will start counting on the fifth pulse of the high frequency clock. The counter cycles according to the truth table set forth in FIG. 5A and the state of the cyclic counter 66 appears at the inputs to the storage register 67. Upon the occurrence of the reference mark from the information track the contents of the counter is transferred to the storage register and the storage register occupied flip-flop 99 will be set so that a binary "0" will thereafter appear at one terminal of AND gate 100 thereby inhibiting the passage of the high frequency clock pulse train through the AND gate 100 to the individual flip-flops 55 through 58 of storage register 67. In this manner, no further changes will take place in the storage register 67 so that the state of the cyclic counter 66 at the time the reference mark appears at the strobe network 50 is stored in the storage register 67 so that the storage register 67 thereafter acts as a reference to indicate the pulse of the high frequency clock which is most nearly synchronous with the reference mark and therefore the binary data stored in the information track of the magnetic medium.

The storage register 67 is a reference to indicate the pulse of the high frequency clock at which the beginning of the reference mark or phi bit occurs. However, it is known that for best results, it is desirable to transfer the information by strobing the information bits near the center of the bit period to avoid the noise that occurs at the beginning and the end of the bit. Thus, a delay timer 68 is provided in the strobe network 50 to generate a strobe pulse at the appropriate time. The operation of the delay timer 68 is seen more easily in FIGS. 7 and 7A.

The delay timer 68 is set in its home state when the strobe network is cleared. The home state of the delay timer 68 is where the flip-flop 64 is in its set state with a "1" appearing at its primary output terminal and flip-flops 63 and 62 are in the reset state with a "0" appearing at the primary output terminals. The counter 68 remains in this state until a binary "1" is applied to the trigger terminal T of flip-flop 64. The generation of this trigger pulse is seen more easily by reference to FIG. 6 which is the gating network for the trigger pulse. The initial trigger pulse is generated upon the occurrence of the reference mark which sets the reference and early bit sensor flip-flop 98. A "1" at the output of bit sensor 98 is applied at one terminal of AND gate 71. One of the other two terminals of AND gate 71 is connected to the primary output terminal of delay timer 3 or flip-flop 64 of counter 68 and the other terminal is connected to the secondary terimnal of delay timer 2 or flip-flop 63 of counter 68. Thus, a binary "1" is applied to the synchronizing bit terminal, a binary "1" is applied to the DT3 terminal at the output of flip-flop 64 and a "1" is also applied to the DT2′ terminal at the output of flip-flop 63 so that the conditions of AND gate 71 are satisfied and a binary "1" is applied to the trigger terminal T of the delay timer or counter 68 to start the counting sequence. The delay timer or counter 68 counts according to the truth table set forth in FIG. 7A.

The strobe pulse at the output of counter 68 is applied through AND gate 92 to the gates 102 and 103 of data buffer 101. The condition of AND gate 92 is satisfied when the flip-flops 62 (DT1), 63 (DT2), and 64 (DT3) of counter 68 are in the "110" state.

By reference to the truth table of FIG. 7A, and the curves E, T, and S of FIGS. 10 and 10A, it is seen that the strobe pulse occurs during the fifth high frequency clock pulse after the occurrence of the pulse that is most closely synchronous to the beginning of the data bits. Thus, with the bit period divided into nine parts and the strobe pulse occurring during the fifth part, the data bits will be strobed slightly beyond the halfway point as is preferred.

A synchronized clock pulse train, also derived at the counter 68, appears at terminal H at the output of AND gate 93. AND gate 93 will havean output when flip-flops 62 and 63 of the counter 68 are both in their "0" state, that is, when the primary terminals have a binary "0" on them, and a binary "1" appears at the secondary terminals.

The counter 68 begins counting when the trigger pulse is applied and counts through its state until the home state is again reached and remains in the home state until the next trigger pulse is applied. The next trigger pulse is applied when the cyclic counter 66 counts through nine steps and again arrives at the state that was transferred to storage register 67. When this state appears at the output of the cyclic counter 66, it is applied to the gating network 69 and in particular to AND gates 73 through 80 thereof. These AND gates, in conjunction with AND gate 72 form a comparison gate which is true when the state of cyclic counter 66 is equal to the state stored in storage register 67 and the delay timer 68 is in the home state. This equality will occur every nine pulses of the high frequency clock. Thereafter, a trigger will be generated and applied to the delay timer 68 to start the timer counting for the generation of the strobe pulse at the proper time and the generation of a synchronized clock pulse train which is shown as curve H in FIGS. 10 and 10A.

It is seen in the timing chart of FIGS. 10 and 10A by a comparison of curves I and G relative to curve E, that the transferred data is delayed five pulses of the high frequency clock behind the recovered data. Thus, in this particular case the information data is strobed into data buffer 101 five-ninths of a bit cell after the information data is applied to the inputs of Exclusive OR gate 104 and data buffer 101. The strobing therefore takes place near the middle of the bit cell which is generally the optimum point for strobing.

In the present state of the art it is common practice to employ the highest packing density possible. When the NRZ method of recording is employed a particular direction of magnetization is employed to represent a binary "1" and the opposite direction is employed to represent a binary "0." Thus, a change from the binary "1" to a binary "0" or from a "0" to a "1" will be represented by a change in the direction of magnetization while a series of zeros or ones will be represented by no change in the direction of magnetization. Thus, when the recorded data is recovered the changes in direction of magnetization will induce a voltage peak in a particular direction to represent either the binary "1" or binary "0" that was recorded.

The output signal induced in a read head for NRZ recording, is shown as curve 120 in FIG. 9. It is seen from curve 120 that a "1" after a "0" is represented by a voltage peak in the positive direction and a "0" after a "1" is represented by a voltage peak in the negative direction. Because the binary "1's" and the binary "0's" are represented by voltage peaks in opposite directions, and because the outputs of the read heads are added algebraically, a succession of changes from "1" to "0" to "1," etc. or "0" to "1" to "0," etc. will cause a shift in the induced voltage peak as shown in curve 120 on FIG. 9.

When the output of the READ head is applied to the amplifiers and shapers in the electronic unit, the resultant binary output, represented by curve 121 in FIG. 9, will also be shifted with respect to the bit cell in which it was recorded. The shifting of the binary bit causes it to exist longer than a bit cell. If the bit is shifted late the shift will be compensated for by the strobe network of the present invention in that the strobe pulse is generated beyond the midpoint of the bit cell; for example, at a point five-ninths along the bit cell rather than at the middle. This compensation can be greater or lesser by increasing the number of parts that a bit cell is divided into and strobing later, or the strobe pulse can be generated later without increasing the number of parts the bit cell is divided into. To provide for strobing at a later time the AND gate 92 may be connected to different output terminals of the delay timer or counter 68. For example, the strobing may be done one pulse later by connecting the bottom lead of AND gate 92 in FIG. 3B to the bottom or secondary output terminal of delay timer 1 instead of the primary output terminal thereof. Thereafter, the conditions of AND gate 92 will be satisfied and a strobe pulse produced when the stages DT1, DT2, and DT3, respectively, have a state of 0, 1, 0, which occurs at the next step in the sequence of counter 68.

The other distortion of early occurrence of a bit caused by heavy packing densities and occurring when recording methods, such as the NRZ method, are used, is compensated for in accordance with the present invention by providing an override circuit that will trigger the delay timer or counter 68 before the equality exists between the state of cyclic counter 66 and the state of storage register 67. As part of this override circuit, the Exclusive OR gate 104 continuously compares the incoming data at terminals I and I' with the delayed transferred data appearing at terminals G and G' at the output of data buffer 101. The operation of the Exclusive OR gate 104 and the override circuit for an early triggering of delay timer 68 for the early generation of a strobe pulse to compensate for an early data bit is seen more clearly by reference to FIGS. 8 and 6, and curves I and G of FIGS. 10 and 10A.

For purposes of clarity the normal position of the binary signals in strobe network 50 is shown in dotted lines on the curves of FIGS. 10 and 10A. For example, the normal position of stroke pulse 111 is shown in dotted lines as strobe pulse 112. In the example, it is assumed that the data bit has shifted two high frequency clock pulses early. This is a shift or distortion of nearly 22% of a bit period. The distortion is generally considerably less than this. However, it is evident from the timing chart in FIGS. 10 and 10A that the timing system of the present invention can readily compensate for this magnitude of distortion or asynchronism.

The compensation for an early data bit takes place as follows:

The synchronized early information data bit 110 occurring at the beginning of period "4" is applied to the Exclusive OR gate 104. When the transferred information data at the output of data buffer 101 is different from the incoming data recovered from the information track, the condition of the Exclusive OR gate 104 is satisfied and a binary "1" is applied to bit sensor 98 to set the flip-flop of sensor 98. The binary "1" at the output of sensor 98 is applied to AND gate 71. The other two terminals of AND gate 71 will have the correct input to satisfy AND gate 71 when delay timer 3 (flip-flop 64) and delay timer 2 (flip-flop 63) are respectively in their "1," "0" state. This condition is satisfied as seen from the truth table of FIG. 7A when the counter 68 is in its home state and one step before the home state. The delay timer or counter 68 begins counting when the trigger pulse is applied to terminal T, which trigger pulse generally occurs when the states of cyclic counter 66 and storage register 67 are equal. As noted above, this condition exists every ninth pulse of the high frequency clock. The delay timer 68 changes state for every pulse of the high frequency clock until it reaches its home state and then remains in this state. Thus, it is seen from the truth table in FIG. 7A that counter 68 completes its counting in eight pulses so that it remains in the home state for at least two pulses before the next trigger is generated through the comparison gate comprising AND gates 72 through 80. Thus, for one pulse of the high frequency clock before equality between cyclic counter 66 and storage register 67 to satisfy the comparison gate for the application of the usual trigger pulse and for one pulse preceding this, the delay timer 68 is in the state that satisfies AND gate 71 in anticipation of the application of a binary "1" from reference and early bit sensor 98. Thus, it is seen that the strobe pulse for transferring the information data through data buffer 101 can be generated as much as two pulses early to compensate for the shifting of the first data bit in a series of data bits that alternate between binary "1's" and "0's." Such an early strobe pulse is pulse 111 of curve S in FIG. 10A. This strobe pulse is two high frequency clock pulses early so that the transferred information data maintains its five high frequency clock pulse delay behind the incoming information data.

Various changes may be made in the details of construction without departing from the spirit and scope of the invention as defined by the appended claims.

What is claimed is:

1. A timing system for clocking digital data recovered from a magnetic storage medium having an information track with information stored therein as bits of binary data having a predetermined bit period and an associated clock track with repetitive binary bits recorded thereon at a bit frequency related to the bit period of the information in the information track, said timing system comprising means for recovering the repetitive binary bits as a clock pulse train from the clock track and means for recovering the information from the information track, means for generating a train of clock pulses synchronized with the recovered clock pulse train with the generated clock pulse train having a frequency that is a selected multiple greater than 1 of the frequency of the recovered clock pulse train, and means responsive to a preselected bit on the information track for selecting one of the pulses of the generated clock pulse train as a reference for clocking the transfer of the recovered information.

2. A system for timing the flow of data relative to a storage medium comprising:

a digital data storage medium having stored thereon in at least one area information data in the form of binary bits having a predetermined bit frequency and grouped to form records with reference bit being stored before the first information data bit in each record and separated from the first information data bit by at least one bit period in which no changes in direction of magnetization on the medium in the area of the recorded record takes place; and having stored thereon in another area a clock pulse train of repetitive binary bits corresponding in bit frequency to the frequency of the information bits stored in an associated area:

means for recovering a record of information data bits;

means for recovering the clock pulse train associated with the selected record;

means utilizing the clock pulse train for generating a synchronized clock pulse train at a frequency that is a selected multiple of the frequency of the bits in the clock pulse train; and
a timing network comprising:
means for selecting a pulse from said generating means that is most nearly synchronous in time with the reference bit of the record being recovered;
means responsive to the selecting means for generating a series of strobe pulses; and
means utilizing the strobe pulse for transferring the binary information data of the record being recovered.

3. A timing network in accordance with claim 2 further comprising means responsive to the occurrence of an information data bit early with respect to its assigned bit period for causing its respective strobe pulse to be generated early.

4. In combination in a magnetic information sorage and retrieval system:
means for utilizing stored information recovered from a storage medium;
a storage medium having
a plurality of infomration tracks grouped to form zones,
a clock track for each zone, and
an address track for each zone;
information data stored in the tracks of a zone as binary bits at the bit frequency assigned to that zone with the binary data being grouped to form records;
a reference bit recorded on the information track before the first information bit in each record and separated therefrom by at least one bit period in which there is no change in the direction of magnetization on the storage medium;
repetitive binary bits stored on the clock track at a frequency related to the frequency of the binary information data in the zone associated with the clock track; and
means for recovering the data stored in a selected information track and the associated address track and the bits from the associated clock track;
a system for timing the flow of information data from a selected track in a selected zone of the storage medium comprising:
means for generating a high frequency clock pulse train having a frequency that is a selected multiple of the frequency at which the bits are stored on the associated clock track, and
means responsive to the reference bit of each record for selecting one pulse of the high frequency clock pulse train in each bit period as a reference for timing the transfer of information from the storage medium to the utilization means.

5. A timing system in accordance with claim 4, wherein the selected multiple for the frequency of the generated clock pulse train is nine.

6. A timing system in accordance with claim 4, wherein the generating means includes a plurality of oscillators, each oscillator associated with one zone of the storage medium and operating at a frequency that is the selected multiple of the pulse repetition rate of the clock pulse train for that zone, and means for synchronizing the oscillator with the associated recovered clock pulse train.

7. A timing system in accordance with claim 4, wherein the generating means includes an oscillator operating at a frequency that is the selected multiple of the pulse repetition rate of the clock pulse train, and means for synchronizing the oscillator with the associated recovered clock pulse train.

8. In combination in a magnetic information storage and retrieval system;
means for utilizing stored information recovered from a storage medium;
a storage medium having a plurality of information tracks grouped to form zones,
a clock track for each zone, and
an address track for each zone;
information data stored in the tracks of a zone as binary bits at the bit frequency assigned to that zone with the binary data being grouped to form a record;
a reference bit recorded on the information track before the first information bit in each record and separated therefrom by at least one bit period in which there is no change in the direction of magnetization on the storage medium;
repetitive binary bits stored on the clock track at a frequency related to the frequency of the binary information data in the zone associated with the clock track;
means for recovering the data stored in a selected information track and the associated address track and the bits from the associated clock track;
a system for timing the flow of information data from the selected track comprising:
means responsive to the recovered bits from the clock track for generating a first synchronized clock pulse train having a frequency that is a selected multiple of the frequency of the recovered clock;
a strobe network having
a cyclic counter which changes states in response to each successive pulse of the generated synchronized clock pulse train;
a storage register responsive to the cyclic counter for storing particular sensed states of the cyclic counter,
means responsive to the recovery of the reference bit of each record on the information track for sensing the state of the cyclic counter at the time of occurrence of the reference bits in the strobe network to permit the storage register to store the sensed states of the cyclic counter, and
means responsive to the stored states in the storage register for generating strobe pulses for the transfer of the binary information data from the storage medium to the utilization means.

9. In combination in a magnetic information storage and retrieval system;
means for utilizing stored information recovered from a storage medium;
a storage medium having
a plurality of information tracks grouped to form zones,
a clock track for each zone, and
an address track for each zone;
information data stored in the tracks of a zone as binary bits at the bit frequency assigned to that zone with the binary data being grouped to form a record;
a reference bit recorded on the information track before the first information bit in each record and separated therefrom by at least one bit period in which there is no change in the direction of magnetization on the storage medium;
repetitive binary bits stored on the clock track at a frequency related to the frequency of the binary information data in the zone associated with the clock track;
means for recovering the data stored in a selected information track and the associated address track and the bits from the associated clock track;
a system for timing the flow of information data from the selected track comprising:
means responsive to the recovered bits from the clock track for generating a first synchronized clock pulse train having a frequency that is a selected multiple of the frequency of the recovered clock;

a strobe network having a cyclic counter which changes states in response to each successive pulse of the generated synchronized clock pulse train;

a storage register responsive to the cyclic counter for storing particular states of the cyclic counter, means responsive to the recovery of the reference bit of each record from the selected information track for causing the register to store a state related to the state of the cyclic counter at the time of recovery of each reference bit, and means responsive to the stored states in the storage register for generating strobe pulses for the transfer of the binary information data from the storage medium to the utilization means.

10. In combination in a magnetic storage and information retrieval system, a magnetic storage medium having a plurality of information tracks grouped to form zones with information stored on the information tracks as bits of binary data recorded at a particular frequency and having a predetermined bit period for the zone in which the track is located, at a frequency equal to the frequency of the information data in the associated zone, the information bits in each track in a zone being divided into segments to form records; a clock track associated with a zone and having a clock pulse train and an address track for each zone, each address track having information stored at the beginning of each record in a preselected pattern to reference the beginning of the record, and a reference bit stored on each information track at the beginning of a record at least one bit period away from the first information data bit, means for recovering the information data and the bits from an associated clock track and address track, a timing system comprising plural means for generating clock pulse trains, each generating means associated with one of the zones on the storage medium and operating at a frequency that is a selected multiple of the pulse repetition rate for the clock pulse train for that zone, means for controlling the operation of the individual generating means to permit only that generating means associated with the selected zone to operate, means for synchronizing the output of the operating generating means with the recovered clock pulse train, and a strobe network for selecting one pulse of the operating generated clock pulse train for controlling the clocking of data relative to said medium, said strobe network including a cyclic counter having a plurality of successive states for counting the pulses in the operating generated clock pulse train, means for sensing the recovery of the reference bits in the selected information track, means for storing a state of the cyclic counter, means responsive to the reference bit sensing means for causing the state of the cyclic counter upon the sensing of each reference bit to be stored in the storing means, a delay timer for generating a strobe pulse at a selected time after the occurrence of each reference bit for clocking the transfer of the recovered information, an equality gate, an override gate, and means responsive to the recovery of each reference bit for initially triggering the delay timer through the override gate, the equality gate sensing the simultaneous states of the cyclic counter and the storing means for subsequently triggering the delay timer when the states are identical, the cyclic counter and the delay timer being clocked by the operating generated clock pulse train.

11. A timing system in accordance with claim 10 wherein the strobe network includes means responsive to each strobe pulse for transferring the recovered information bits, means for comparing the timing of each transferred information bit with the timing of the succeeding information bit for generating a signal when the timing of the succeeding information bit is early with respect to the timing of the transferred information bit, and means for applying the generated compare signal to the delay timer through the override gate to provide an early strobe pulse for transferring such succeeding information bit by the transferring means.

References Cited

UNITED STATES PATENTS

| | | | |
|---|---|---|---|
| 3,199,111 | 8/1965 | Jennings et al. | 340—172.5 XR |
| 3,348,229 | 10/1967 | Freas | 340—172.5 XR |
| 3,394,355 | 7/1968 | Sliwkowski | 340—172.5 |
| 3,417,377 | 12/1968 | Vietor et al. | 340—172.5 |
| 3,417,378 | 12/1968 | Simonsen et al. | 340—172.5 |

PAUL J. HENON, Primary Examiner

H. E. SPRINGBORN, Assistant Examiner

PO-1050
(5/69)

UNITED STATES PATENT OFFICE
CERTIFICATE OF CORRECTION

Patent No. 3,537,075 Dated October 27, 1970

Inventor(s) L. O. Anderson et al

It is certified that error appears in the above-identified patent and that said Letters Patent are hereby corrected as shown below:

Column 3, line 45, after "zone" delete "which" and insert --. Each source--; line 64, after "employing" delete "an isolated" and insert --a--; line 65 after "responsive to" delete "a" and insert --an isolated--.

Column 4, line 58, "FIGS." should read --FIG.--.
Column 5, line 30, "associted" should read --associated--.
Column 6, line 8, after "curves" delete "of" and insert --in--;
Column 7, line 66, after "which" insert --also--.
Column 8, line 23, after "50" insert --and--.
Column 9, line 43, after "the" delete "the"; line 46 after "train" insert --is applied--; line 57 after "network" delete "so" and insert --50--.

Column 10, line 44, after "curve" delete "EI and insert --I--.
Column 11, line 49, after "bit" insert --period--.
Column 12, line 21, "havean" should read --have an--; line 27, "state" should read --states--. Column 14, line 61, after "with" insert --a--. Column 15, line 23, "infomration" should read --information--.

Signed and sealed this 10th day of August 1971.

(SEAL)
Attest:

EDWARD M.FLETCHER,JR.
Attesting Officer

WILLIAM E. SCHUYLER, JR.
Commissioner of Patents